Dec. 2, 1941. H. C. RATEAU 2,264,551
REFRACTORY LINING FOR FURNACES AND THE LIKE
Filed March 16, 1939 2 Sheets-Sheet 1
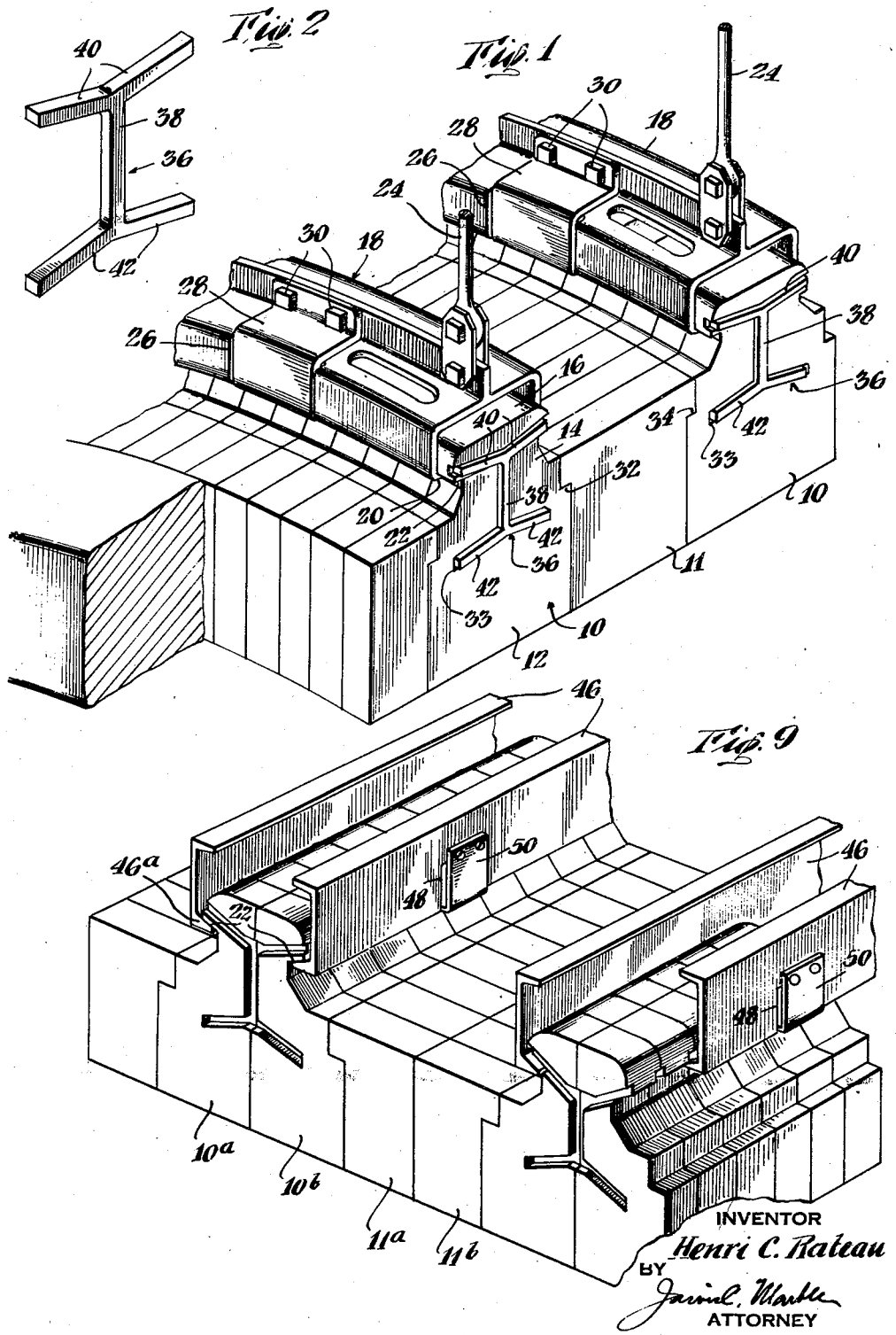
INVENTOR
Henri C. Rateau
BY
ATTORNEY Dec. 2, 1941.   H. C. RATEAU   2,264,551
REFRACTORY LINING FOR FURNACES AND THE LIKE
Filed March 16, 1939   2 Sheets-Sheet 2
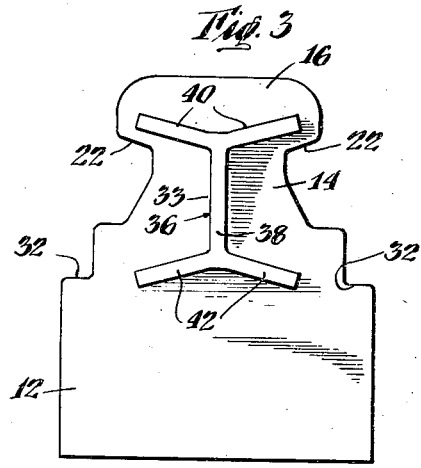
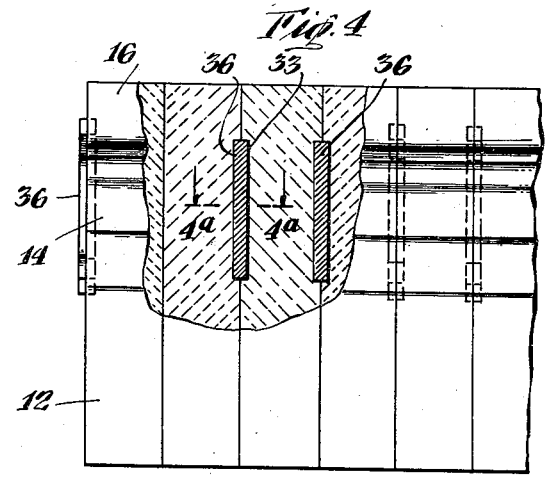
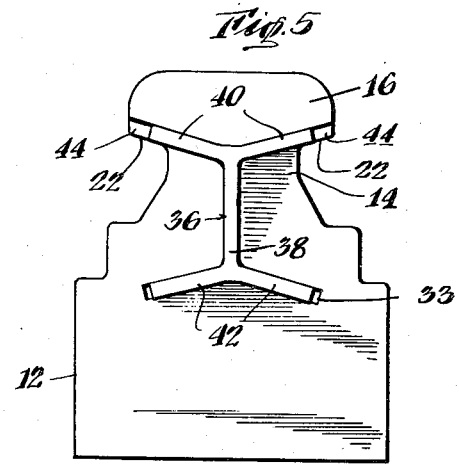
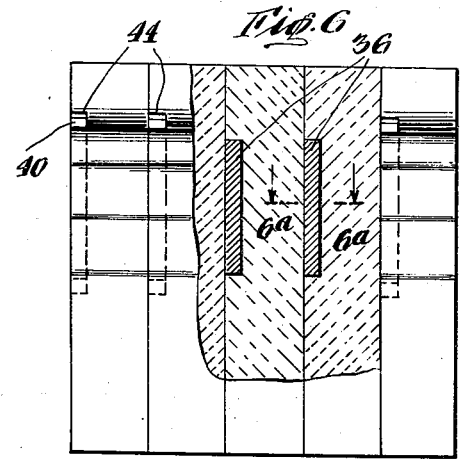
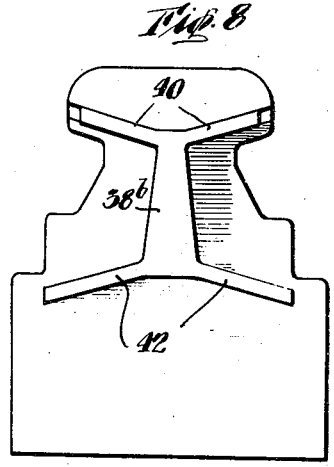
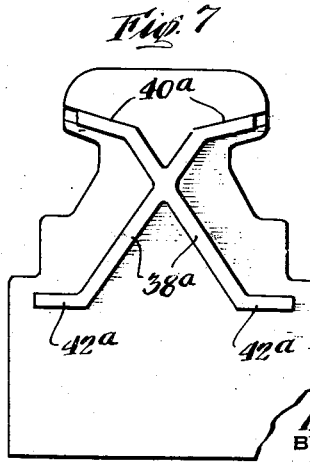
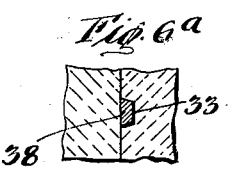
INVENTOR
Henri C. Rateau
BY
ATTORNEY Patented Dec. 2, 1941

2,264,551

UNITED STATES PATENT OFFICE 2,264,551

REFRACTORY LINING FOR FURNACES AND THE LIKE

Henri C. Rateau, Weirton, W. Va., assignor to American Arch Company, New York, N. Y., a corporation of Delaware Application March 16, 1939, Serial No. 262,147

12 Claims. (Cl. 110—99)

The present invention relates to sectional refractory furnace linings and has particular reference to sectionally suspended refractory linings for furnace roofs or arches.

In sectional refractory linings of the type under consideration in which the roofs and in some instances the walls as well are lined with refractory tile or brick individually supported or independently supported in groups by an outer metallic framework, difficulties are frequently encountered due to fracture of one or more of the tile, particularly in the case of suspended tile, which results in substantial portions of the tile falling into the furnace. In cases where tile are independently supported in groups, failure of one tile may result in not only portions of the broken tile falling into the furnace, but, due to lack of key support, several additional and unbroken tile may fall into the furnace.

The highly undesirable nature of such occurrence is obvious, particularly in the case of the refractory linings for glass furnaces, open hearth furnaces and the like where the tile falling into the furnace may result in spoiling a whole heat or melt of molten material in the furnace.

The danger of fracture of refractory tile is particularly present in the case of the very high temperature furnaces of the kind in which material is melted, which among other things usually require relatively deep and heavy refractory linings in order to have satisfactory length of life under the severe temperature conditions.

Such deep linings necessitate the suspending of roofs of very considerable weight and where in the interests of simplicity and economy of support structure only certain tile or rows of tile are suspended from the supporting framework and which in turn support intermediate rows of filler tile, the weight imposed on the suspended supporting tile is considerable. This is particularly true in view of the fact that many of the materials most suitable for the manufacture of refractory tile from the standpoint of ability to withstand high temperatures without deterioration, have relatively low mechanical strength.

The conditions leading to failure of suspended tile may be made less dangerous to some degree by individually suspending each tile, thus reducing to the minimum the load on the tile, but this necessitates the use of relatively elaborate and costly supporting structure and even with such supporting structure the result desired cannot always be insured because of the fact that the shape of the suspended tile necessary for its cooperation with metal hangers or other retaining means must, in nearly all instances, be such as to result in relatively weak tile sections subject to strain.

It is the general object of the present invention to provide novel and improved refractory lining construction, particularly suitable for suspended roofs or arches, in which the refractory tile may be simply and advantageously mounted with the minimum of external supporting structure and which may, if desired, include rows of filler tile indirectly supported from the outer framework, while at the same time providing a reinforced construction within the refractory lining itself which will operate to prevent portions of the lining from falling inwardly of the furnace in the event one or more of the tile engaging the supporting structure fails in service.

The above general object and other and more detailed objects of the invention are attained in accordance with the invention by utilizing what may be termed reinforcing anchor members of metal received in suitable recesses in side surfaces of the suspended tile, which anchor members are held in position by the abutment of adjacent tile and which serve to provide a metallic connection between the main body portion of the tile and the supporting portions of the tile which are in engagement with the outer supporting structure.

For a better understanding of the manner in which the invention may advantageously be carried into effect, reference may best be had to the ensuing portion of this specification, in which various specific embodiments of the invention are illustrated and which will be described in conjunction with the accompanying drawings in which:

Fig. 1 is a perspective view of a portion of a refractory arch or roof lining embodying the invention;

Fig. 2 is a perspective view of an anchor member of the kind employed in the structure shown in Fig. 1;

Fig. 3 is an elevation of a tile of the kind shown in Fig. 1 with the anchor member shown in Fig. 2 in assembled position;

Fig. 4 is an elevation partly in section taken at right angles to Fig. 3 and showing preferred modes of assembling the tile and anchor members;

Fig. 4a is a fragmentary section taken on the line 4a—4a of Fig. 4;

Fig. 5 is a view similar to Fig. 3 showing a different form of tile adapted to be used with the shape of anchor member shown in Fig. 2;

Fig. 6 is a view similar to Fig. 4 showing another mode of assembling the tile and anchor members;

Fig. 6a is a fragmentary section taken on the line 6a—6a of Fig. 6;

Figs. 7 and 8 are views similar to Fig. 3 showing other specific shapes of anchor member; and Fig. 9 is a view similar to Fig. 1 showing another embodiment of the invention.

Referring now to the drawings, the construction illustrated shows a portion of a sectionally supported furnace arch consisting of spaced rows of refractory supporting tile 10 between which are located intermediate rows of filler tile 11 supported by tile 10.

The supporting tile 10 comprise substantially rectangular body portions 12 (see Fig. 3), relatively narrow neck portions 14, and enlarged head portions 16.

In the embodiment illustrated the neck portions of the supporting tile are received within and supported by hanger castings 18 of generally rectangular hollow form in cross section and having inturned flanges 20 adapted to engage the shoulders 22 formed by the undersides of the heads 16 of the tile.

The hanger castings may be supported in any suitable manner, preferably by means of articulated hanger rods 24 which are in turn connected to any suitable outer framework of structural steel or the like.

The hanger castings are provided with side openings 26 at suitably spaced intervals through which the tile can conveniently be threaded into the castings or removed therefrom, these openings being closed by suitable cover plates 28 through the medium of removable bolt and nut connections 30.

In the embodiment illustrated the supporting tile are notched as at 32 at the upper corners of the main body portion 12 to provide shoulders for the support of intervening rows of filler tile 11, the latter being provided with projections 34 at their upper corners which rest on the shoulders provided by the recesses or notches 32 in the supporting tile. It will be evident that if intermediate rows of filler tile are not employed the notches 32 may be omitted from the supporting tile.

The side faces of the supporting tile are provided with recesses 33 for the reception of metal anchor members 36 which in the embodiment illustrated are generally I-shaped in form having a web portion 38 and two pairs of laterally extending arms 40 and 42, respectively.

The recesses formed in the side faces of the tile are located so that the portions thereof for the reception of the lower arms 42 of the anchor member are located in the main body portion of the tile while the branches of the recesses for the reception of the arms 40 are located in the relatively wide head portion 16 of the tile and preferably extend laterally past the inner edges of the shoulders 22 which engage the hanger castings. The laterally extending portions of the recesses in the faces of the tile are connected by a portion for the reception of the web part 38 of the anchor members, this web portion extending through the narrow and relatively weak neck portion of the tile.

The specific manner in which these recesses in the faces of the tile may be formed is subject to considerable variation within the scope of the invention.

As illustrated in Fig. 1 and in the left hand portion of Fig. 4, each of the suspended tile may be formed with a recess having depth only sufficient to partially accommodate an anchor member 36, the opposite face of the tile being left plane. With this form of tile the several rows of supporting tile are assembled with the plane faces of two adjacent tile confronting each other and the recessed faces of adjacent tile confronting each other, as shown in the left hand portion of Fig. 4.

With this mode of assembly each anchor member is held in position between a pair of tile and one such anchor member is thus required only between alternate tile.

Since the tile are usually cast, the recesses 33 in the side faces are advantageously tapered in section as shown in Fig. 4a to provide clearance for removal of the tile from the molds, and in order to provide uniform clearance for the anchor members (preferably of the order of one-eighth of an inch) which are ordinarily relatively rough surfaced castings, the latter are advantageously tapered in cross-section in the manner shown in the figure.

Referring again to Fig. 1, the manner in which the construction illustrated serves to accomplish the desired object will largely be apparent from the drawings. It is evident that in so far as mechanical strain is concerned, the parts of the refractory lining subjected to greatest stress are the relatively narrow neck portions 14 and any failure of the tile is most likely to occur at this place. It will further be evident that without the anchor members a failure of a supporting tile at the neck would not only operate to permit the major portion of the broken tile, consisting of the main body portion, to fall into the furnace but would also permit, in the construction shown, at least two adjacent filler tile to fall into the furnace because of lack of support at one of their respective sides.

With the use of the metal anchor members however, fracture of one of the supporting tile will not result in portions of the broken tile or of any other tile falling from the lining since the anchor member will obviously operate to support the portion which it is assumed has broken away from the supported head portion of the tile. Even if relatively severe fracturing occurs, of a nature resulting in the head and neck portion of the tile being broken into several pieces, the anchor member would still operate to support the main body portion of the tile against falling since the upper arms 40 of the member, as previously noted, preferably extend outwardly far enough to overlie the inturned flanges of the hanger and would derive direct support from the hanger casting in the event of complete failure of the head portion of the tile.

Ordinarily, a single anchor member recessed into one side face of each supporting tile provides sufficient support, but as will readily be appreciated, if in some instances further precaution is desired, both side faces of each supporting tile may be recessed as indicated at the right of Fig. 4 for the reception of anchor members inserted between each two adjacent tile.

In Fig. 5 a somewhat different location of the recess in the tile face for the reception of the anchor member 36 has been shown. In this embodiment the upper lateral branches of the recess are located in a manner such that the outer ends of these branches terminate in notches 44 at the sides of the shoulders 22. In this case when the tile and anchor member are in assembled position the outer ends of the laterally extending arms 40 of the anchor member may bear directly on the upper faces of the supporting flanges of the anchor castings.

In Fig. 6 an alternative arrangement for the reception of the anchor members in the tile is shown. This arrangement differs from the arrangements shown in Fig. 4 by the fact that one side face of each tile is recessed to a depth sufficient to permit the anchor member to be wholly imbedded in the tile so as to be flush with the side face. This arrangement necessitates the use of at least one anchor member for each tile. The arrangement illustrated at the left of Fig. 4, is however to be preferred since this affords sufficient mechanical strength for the purpose intended and at the same time requires the minimum reduction in cross-sectional area of the neck portion of the tile for the accommodation of the anchor members.

As illustrated in Fig. 6a, the tapered cross-sectional shape of the anchor members is advantageously employed to provide uniform clearance between these members and the tapered recesses in the tile, as previously described in connection with Figs. 4 and 4a.

In Fig. 7 an alternative shape of anchor member is shown which is generally X-shaped, the laterally extending webs 40a and 42a being connected by the crossed webs 38a.

In Fig. 8 another alternative shape of anchor member has been illustrated, that is particularly suitable for use in heavy duty furnaces or in furnaces where it is desirable for production reasons that the furnace be operated for long periods of time without being shut down. In such furnaces it may happen that it is desirable to maintain them in operation after the tile have burned away to an extent exposing the anchor members, before the furnace is shut down for repairs. In such cases it is possible for the lower portion 42 of the anchor member to be burned away and in order to prevent portions of the tile from falling into the furnace in such event, the form of anchor member shown in Fig. 8 may advantageously be employed. In this form, which is in general similar to the form shown in Fig. 2, the upper and lower laterally extending arms are connected by a web portion 38b that is tapered from end to end, being broader at the place of juncture with the lower arms 42 than at its upper end. As it will be observed from the drawings, the lower laterally extending arms 42 could be burned away but the web 38b would still provide a support for the portions of the tile above the level of these arms, for preventing fractured portions of the tile from falling into the furnace, due to the wedging action of the tapered web.

It will be apparent that the tile may be recessed in any of the different specific ways shown in Figs. 3 to 6 for the reception of anchor members of the shapes shown in Figs. 7 and 8, as well as for the shape of the anchor member shown in Fig. 2.

Turning now to Fig. 9, the construction illustrated is in general similar to that illustrated in Fig. 1 except for the following particulars. Instead of using special hanger castings, pairs of confronting channel members 46 of structural steel are employed, these channel members being supported at their ends by an outer framework in any suitable known manner and confronting pairs being spaced so that their lower flanges 46a extend beneath and engage the shoulders 22 on the undersides of the heads of the tile. The channels 46 are provided with spaced openings 48 closed by removable cover plates 50 through which openings the supporting tile may be threaded into position or removed from between the channels.

In some instances it is desirable for manufacturing and other reasons, to have the refractory tile incorporated in the construction in smaller units than those shown in the preceding figures and in the present embodiment the supporting tile are each formed of two complementary sections 10a and 10b. Also the filler tile may be made in the same manner comprising sections 11a and 11b.

As will be apparent from Fig. 2 the dividing of the supporting tile in the manner illustrated in no way affects the efficacy of the anchor members with respect to their function of providing support in case of tile failure. Regardless of whether one or the other of the sections of the supporting tile, or both, fail, the body portions of the section or sections that have failed are positively supported by the anchor member and such support in turn operates to provide the required support for the adjacent sections of the filler tile. It will be apparent to those skilled in the art that the principles of the present invention may be applied to many different specific shapes of refractory tile and further may be utilized in conjunction with other specific forms of hanger structure. Also, it will be apparent that the advantages of preventing movement of broken tile sections from a sectional lining inwardly of the furnace by use of the principles of this invention will apply to sectionally supported inclined or even vertically disposed side wall linings for furnaces since in such structures the nature of the loading and the forces acting on the inner portions of the refractory may be such as to cause them to be forced inwardly of the furnace except as they are restrained by outer supporting structure. It further will be apparent that the application of the principles of the present invention is not limited to use with tile of any specific material and as herein employed the term "refractory" is to be understood as broadly inclusive of all types of material such as fire-clay, silicon, carborundum, asbestos mixtures or any other material suitable for lining furnaces.

The invention is accordingly to be understood as not limited to the specific forms of construction shown herein by way of example but is to be taken as embracing all structures falling within the scope of the appended claims.

What is claimed is:

1. In refractory lining structure for furnaces and the like, a row of refractory tile, said tile having inner body portions and outer head portions adapted to be engaged by supporting members to prevent inward displacement of the tile, and metal anchor members located in suitable recesses in the side faces of at least certain of the tile and providing a metallic connection between the head portions and the body portions of the tile, said anchor members each having transversely extending portions in the head portions and in the body portions of the tile and web portions connecting said transversely extending portions, said web portions being tapered and increasing in width in the direction from the head portion to the body portion of the tile.

2. For use in refractory furnace linings, a cast metal anchor member adapted to be enclosed between the side faces of two adjacent refractory tile, said anchor member comprising spaced transversely extending arm portions, and a web portion connecting said arm portions, said web portion being tapered to be materially narrower at the place of juncture with one of said transversely extending portions than at the place of juncture with the other of said transversely extending portions.

3. A refractory lining structure adapted to be suspended from supporting structure; comprising a series of tiles, said series containing tile having a refractory body portion including a lining surface at one end of said tile, and having at the opposite end of said tile a supporting head portion including a surface adapted to engage said supporting structure, said body portion having opposed faces and opposed sides adapted to contact like faces and sides of adjacent tile in said structure, and metal anchor members substantially enclosed between the contiguous faces of at least certain of said tiles, each of said anchor members having extending portions engaging the body portion and the supporting head portion respectively, of at least one of the two tiles between which it is positioned to thereby hold the body portion and the supporting head portion together in the event of fracture of said tile while in use in a furnace.

4. A refractory lining structure adapted to be suspended from supporting structure, comprising a plurality of contiguous refractory tile having a body portion including an exposed lining surface at one end of said tile and at its opposite end a support portion comprising a neck portion smaller than said body portion and a head portion wider than said neck portion, said head portion including an exposed surface adapted to engage said supporting structure, said body portion having opposed faces and opposed sides adapted to contact like faces and sides of adjacent tile in said structure, and a metal anchor member substantially enclosed between the contiguous faces of at least certain of said tile, said anchor member engaging the body portion and the head portion of at least one of the two tiles between which it is positioned whereby said body portion will remain anchored to said head portion in the event of fracture of the tile thus engaged by said anchor member, while in use in a furnace.

5. The structure set forth in claim 4 wherein at least one of the two tiles between which each of said anchor members is positioned is provided with a recessed surface adapted to receive said anchor member.

6. The structure set forth in claim 4 wherein said anchor member comprises arms adapted to extend laterally into both the body portion and support portion of at least one of the two tiles between which each of said anchor members is positioned.

7. The structure set forth in claim 4 wherein each of the two tiles between which said anchor member is positioned, is provided with a recess adapted to receive said anchor member, and wherein said anchor member has a thickness greater than the depth of said recess.

8. The structure set forth in claim 4 wherein at least one of the two tiles between which said anchor member is positioned is provided with a recessed surface in which said anchor member is wholly located.

9. For use in a refractory lining structure adapted to be suspended from supporting structure, a tile having a refractory body portion including a lining surface at one end of said tile and having at the opposite end of said tile a support portion, including a surface adapted to engage means suspended from said supporting structure, said support portion comprising a neck portion smaller than said body portion and a head portion wider than said neck portion, said body portion having opposed faces and opposed sides adapted to contact like faces and sides of adjacent tile when embodied in a refractory lining structure, at least one of the faces of said tile being provided with a recess adapted to receive a metal anchor member comprising connected arms adapted to laterally extend into the surface of said body portion and said head portion, whereby said body portion will remain anchored to said head portion in the event of fracture while in use in a furnace.

10. For use in a refractory lining structure adapted to be suspended from supporting structure, a pair of refractory tile, each having at one end thereof a body portion including a lining surface and at the opposite end a support portion comprising a neck portion smaller than said body portion and a head portion wider than said neck portion, said head portion including a surface adapted to engage said supporting structure, each of said body portions having opposed faces and opposed sides adapted to contact like faces and like sides of adjacent tile when embodied in a refractory lining structure, the confronting faces of each of said pair being recessed, and a metal anchor member positioned between the two tiles of said pair of tile and partially received by said recess of each tile, said anchor member having arms laterally extending into said recesses in said body portion and said head portion whereby said body portions will remain anchored to said head portions in the event of fracture of either or both of said pair of tiles while in use in a furnace.

11. The tile described in claim 10 wherein said tile is symmetrically parted on its vertical axis to thereby provide like tile sections each adapted to be engaged by the same anchor member.

12. For use in a refractory lining structure adapted to be suspended from a supporting structure, a tile having a refractory body portion including a lining surface at one end of said tile and having at the opposite end of said tile a support portion, including a surface adapted to engage said supporting structure, said support portion being integrally connected to said body portion through a portion of said tile having a cross sectional area substantially less than that of said body portion, said body portion having opposed faces and opposed sides adapted to contact like faces and sides of adjacent tile when embodied in a refractory lining structure, said tile being provided with a recess extending from said body portion across the connecting portion into said support portion, at least a portion of said recess extending in a substantially horizontal direction when the tile is in position in a refractory lining structure, said recess being adapted to receive a metal anchor member having extending portions adapted to engage said body portion and said support portion, to thereby hold said body portion and said support portion together in the event of fracture of the relatively weak connecting portion.

HENRI C. RATEAU.